(12) United States Patent
Sivalingham et al.

(10) Patent No.: US 7,586,882 B2
(45) Date of Patent: Sep. 8, 2009

(54) HIGHER LAYER PACKET FRAMING USING RLP

(75) Inventors: Sanjeevan Sivalingham, San Diego, CA (US); Srinivasan Balasubramanian, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 599 days.

(21) Appl. No.: 11/140,388

(22) Filed: May 27, 2005

(65) Prior Publication Data

US 2005/0220071 A1    Oct. 6, 2005

Related U.S. Application Data

(63) Continuation-in-part of application No. 11/084,888, filed on Mar. 21, 2005, now abandoned.

(51) Int. Cl.
*H04B 7/216* (2006.01)
(52) U.S. Cl. ............... 370/335; 370/338; 370/349; 709/236; 714/18
(58) Field of Classification Search .......... 370/335, 370/349, 389, 338; 709/236; 714/18
See application file for complete search history.

(56) References Cited

U.S. PATENT DOCUMENTS

| 6,256,300 B1 | 7/2001 | Ahmed et al. | |
| 6,845,105 B1 * | 1/2005 | Olsson et al. | 370/469 |
| 6,999,434 B1 * | 2/2006 | Agrawal et al. | 370/331 |
| 2001/0032325 A1 * | 10/2001 | Fong et al. | 714/18 |
| 2002/0087716 A1 * | 7/2002 | Mustafa | 709/236 |
| 2003/0002467 A1 | 1/2003 | Leung | |

FOREIGN PATENT DOCUMENTS

| EP | 1 014 641 | 6/2000 |
| WO | WO 02/073910 | 9/2002 |

OTHER PUBLICATIONS

Garg V K et al: "Mobile IP for 3G wireless networks" Personal Wirelss Communications, 2000 IEEE International Conference on Dec. 17-20, 2000, Piscataway, NJ, USA, IEEE, Dec. 17, 2000, pp. 240-244, XP010534050.
3GPP: "3rd Generation Partnership Project; Technical Specification Group Radio Access Network; Radio link Control (RLC) protocol specification (Release 5)" 3GPP TS 25.322 V5.7.0, Dec. 2003, XP014016808.

* cited by examiner

*Primary Examiner*—Danh C Le
(74) *Attorney, Agent, or Firm*—Coats & Bennett, P.L.L.C.

(57) ABSTRACT

Higher layer packet (HLP) framing information is transmitted across an air interface only as necessary, utilizing the Radio Link Protocol (RLP). In one embodiment, HLP framing information is transmitted in RLP control frames, between each HLP. In another embodiment, HLP framing information is transmitted in RLP data frames, with the RLP data frames including an indicator of that framing information. In three other embodiments, HLP framing information is transmitted in RLP data frames, and those RLP data frames containing HLP framing information are identified by RLP control frame functions. The control frame functions may comprise unnumbered RLP control frames, RLP data frames numbered using the RLP data frame sequence space but containing no HLP data, or RLP control frames numbered using an alternate sequence space.

33 Claims, 5 Drawing Sheets

HIGHER LAYER PACKET FRAMING USING RLP

RELATED APPLICATIONS

This application is a Continuation in Part of U.S. patent application Ser No. 11/084,888, Filed Mar. 21, 2005 now abandoned.

BACKGROUND

The present invention relates generally to the field of wireless communication networks and in particular to a method of communicating the boundaries of higher layer data packets using the Radio Link Protocol (RLP).

The 3rd Generation (3G) wireless communication networks provide mobile users wireless access to packet data networks, such as the Internet. Many Internet applications and services, once available only to users at fixed terminals, are now being made available via wireless communication networks to mobile users. Services such as real-time streaming video and music, on-line interactive gaming, text messaging, email, web browsing and Voice over IP (VoIP), or Push-to-Talk ("walkie talkie" functionality) are just a few examples of services now being provided via wireless networks to mobile users.

These services are characterized by packet-switched data transfer, in which data is encapsulated into a logical unit called a packet, which contains a source and destination address and is routed from source to destination along nodes in one or more networks. Many data packets may be transmitted together on shared wireless traffic channels, with each mobile station retrieving only data packets addressed to it. This mode of data transfer is distinguished from the traditional circuit-switched paradigm of early-generation wireless voice communications, wherein a wireless traffic channel was dedicated to each individual call, or voice conversation. Packet-switched data transfer is generally more flexible and allows for more efficient utilization of network resources, than circuit-switched data transfer. However, data packets may also be transmitted on dedicated traffic channels.

According to some modern wireless communication network standards, a Packet Data Service Node (PDSN) within the network interfaces to external packet-switched data networks, such as the Internet, and effects Internet Protocol (IP) packet data communication between these external networks and the Radio Access Network (RAN) of the wireless system. Within the RAN, a Base Station Controller (BSC) eventually receives packet data forwarded by the PDSN, and directs it to individual mobile stations in radio contact with one or more Radio Base Stations. Packets are also communicated in the reverse direction, from a mobile station to an external network node.

On the wireless network side of the PDSN, under some current network standards a Point-to-Point Protocol (PPP) is established between the PDSN and the mobile station. The PPP protocol uses a High-level Data Link Control (HDLC) protocol link layer. The HDLC service encapsulates higher layer packets (HLP) into data link layer frames. The frames are separated by HDLC flags, or unique bit sequences that delimit the beginning and end of a frame. To prevent data within the frame, which may have the same bit sequence as a flag, from causing erroneous frame boundary determinations, flag-matching bit sequences within the HDLC frame payload are escaped and modified. That is, a second unique bit sequence, the escape sequence, is inserted, and the flag-matching bit pattern is modified, such as by XOR with a predetermined value. Any occurrence in the data of the escape sequence itself is also escaped and modified. This protocol makes the HDLC frame "transparent," in that any sequence of data bits may be reliably transmitted.

At the receiver, each octet in the frame is inspected, and the data between two occurrences of the flag bit sequence are determined to comprise the HDLC frame. Additionally, the frame data is searched for the escape sequence. If found, the escape sequence is removed, and the following octet is XORed with the predetermined value, restoring the data to its original state. This need to inspect each and every received octet to detect either a frame-delimiting flag or an escape sequence is processor-intensive. The task may be delegated to hardware; however, this would impose a new requirement on equipment manufacturers, and require an upgrade of fielded equipment. An additional drawback of the HDLC framing protocol is that each occurrence of the escape sequence must be transmitted across the air interface, only to be removed by the receiver. This wastes scarce air interface resources.

In the Broadcast/Multicast Services (BCMCS) architecture, PPP, and hence, HDLC, is not utilized. In BCMCS, the framing protocol takes advantage of the traffic channel frame structure to transmit information regarding higher layer packet (HLP) framing. In particular, the framing protocol at the transmitter utilizes a predetermined number of bits at the beginning of the data in each Multiplexing Sublayer Protocol Data Unit (MuxPDU) to pass higher layer framing information. The bits indicate whether the data in the MuxPDU comprise a fragment of a HLP or a complete HLP. In the case of a fragment, the bits further indicate whether the fragment is from the beginning, middle or end of the HLP.

In the case where the MuxPDU is of a fixed size (e.g., BCMCS over a High-Rate Packet Data channel), a length field is also included at the beginning of the data in each MuxPDU. The length field indicates how much of the data in the fixed-size MuxPDU belongs to a particular HLP. Data from another HLP (with framing information bits included) or perhaps padding is added to fill the MuxPDU. In the case of a variable-size MuxPDU (e.g., BCMCS over CDMA2000-1X), the data in each MuxPDU contains only bits indicating framing information. No length information is included, as the MuxPDU header provides this information.

The receiver examines the beginning of the data in each MuxPDU received. It utilizes the framing information bits to determine whether the payload contains a complete HLP or a fragment of a HLP. In the case of fragments, the receiver utilizes the framing bits to re-assemble the HLP from data transmitted in multiple MuxPDUs. In the case of fixed-size MuxPDUs, the receiver also utilizes the length information bits to determine how much of the data in the MuxPDU belongs to a particular HLP. Since the framing and length (when present) information are positioned at the beginning of the data in each MuxPDU, the receiver can obtain this information efficiently, without having to parse all received data octets, as required in HDLC.

Although the BCMCS framing method is less processor-intensive than HDLC, it requires framing and length information to be sent in the data payload of every MuxPDU. For packet data services where RLP is utilized, the inclusion of the framing and length information results in at least one octet of RLP payload (or possibly more, depending on of the size of the length field) not being available to carry actual data, since the RLP payload consists of integer number of data octets. In many cases, the framing and length information in several of the RLP frames/MuxPDUs is redundant, as the same information is carried in several consecutive RLP data frames/MuxPDUs. For example, where the HLP spans several RLP data frames, all of the RLP data frames carrying data from the middle of the HLP (i.e., not the beginning or the end) carry the same framing information. This may occur, for example when a large HLP is being transmitted with a low data rate assigned to the air interface channel.

Framing methods that avoid the inefficiencies of HDLC framing will be necessary for the evolution of the CDMA2000 Packet Data Architecture. The BCMCS framing approach is an improvement over HDLC, but still consumes air interface resources to transmit framing and packet length information. Optimally, these resources should be reserved for user data to the maximum extent possible.

SUMMARY

According to various embodiments of the present invention, higher layer packet (HLP) framing information is transmitted across the air interface only as necessary, utilizing the Radio Link Protocol (RLP). In one embodiment, HLP framing information is transmitted in RLP control frames, between each HLP. In another embodiment, HLP framing information is transmitted in RLP data frames, with the RLP data frames including an indicator of that framing information. In three other embodiments, HLP framing information is transmitted in RLP data frames, and those RLP data frames containing HLP framing information are identified by RLP control frame functions. The control frame functions may comprise unnumbered RLP control frames, RLP data frames numbered using the RLP data frame sequence space but containing no HLP data, or RLP control frames numbered using an alternate sequence space In one embodiment, the present invention relates to a method of transmitting one or more Higher Layer Packets (HLP) in a wireless communication network utilizing the Radio Link Protocol (RLP). A HLP is encapsulated into a plurality of RLP data frames, each having a unique RLP sequence number, such that only the RLP data frame containing the beginning of the HLP and the RLP data frame containing the end of the HLP include HLP framing information. The RLP data frames are transmitted to a receiver. An indication of which RLP data frames contain HLP framing information is separately transmitted to the receiver

DETAILED DESCRIPTION

Figure 1:
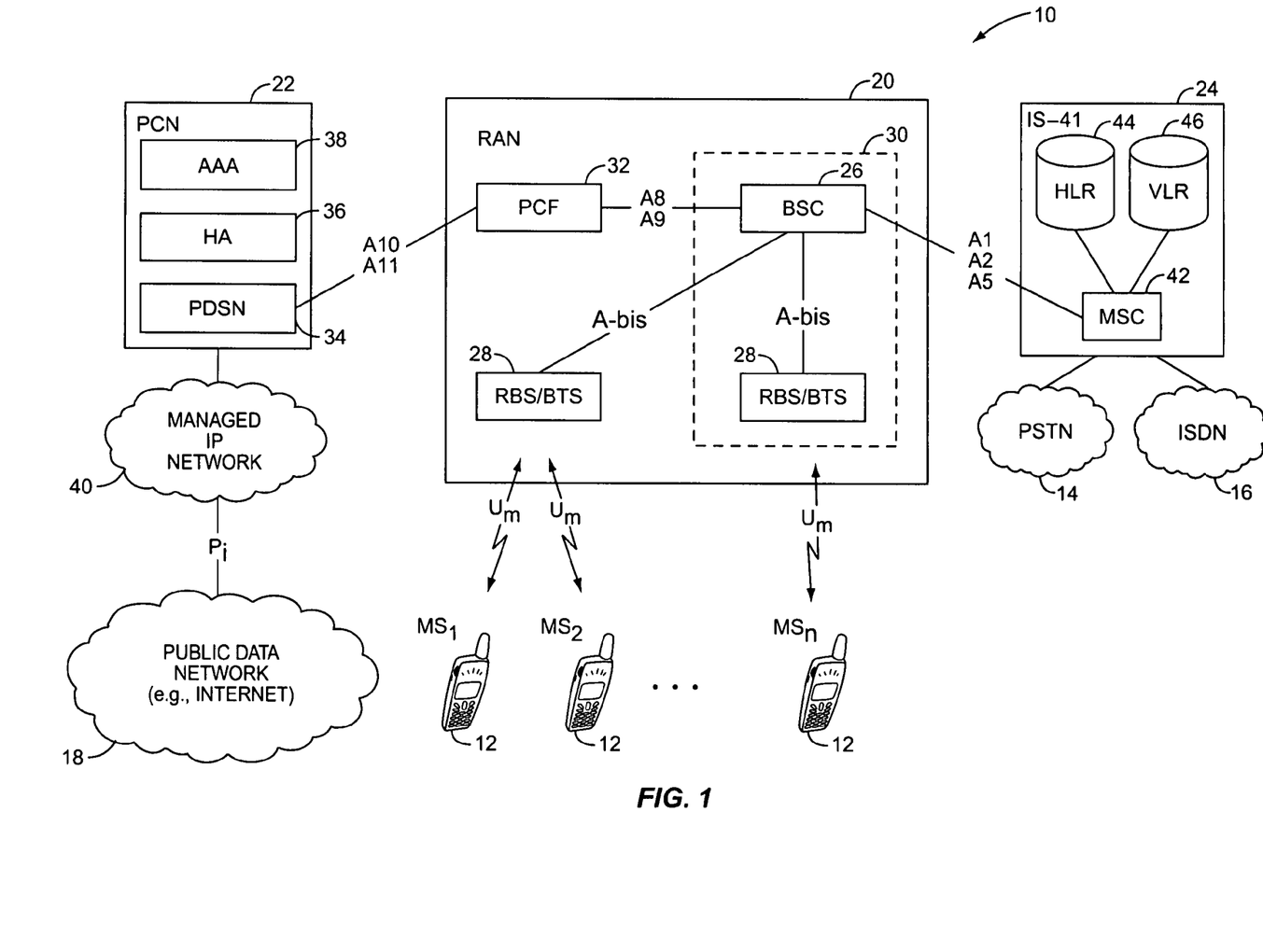
FIG. 1 is a functional block diagram of a wireless communication network.

FIG. 1 illustrates an exemplary wireless communication network generally referred to by the numeral 10. The wireless communication network 10 may be any type of wireless communication network, such as a CDMA network, WCDMA network, GSM/GPRS network, EDGE network, or UMTS network. In one exemplary embodiment, network 10 is based on cdma2000-1x standards as promulgated by the Telecommunications Industry Association (TIA), although the present invention is not limited to such implementations. Here, network 10 communicatively couples one or more mobile stations 12 to another mobile station 12, or to the Public Switched Telephone Network (PSTN) 14, the Integrated Data Services Network (ISDN) 16, and/or a Public Data Network (PDN) 18, such as the Internet. In support of this functionality, the network 10 comprises a Radio Access Network (RAN) 20 connected to a Packet Core Network (PCN) 22 and an IS-41 network 24.

The RAN 20 typically comprises one or more Base Station Controllers (BSCs) 26, each connected to one or more Radio Base Stations (RBS) 28 via an A-bis interface. Each RBS 28 (also known in the art as a Base Transceiver Station, or BTS) includes the transceiver resources (not shown) supporting radio communication with mobile stations 12, such as modulators/demodulators, baseband processors, radio frequency (RF) power amplifiers, antennas, etc. The combination of a BSC 26 and a RBS 28 form a Base Station (BS) 30. Note that a given BSC 26 may be part of more than one BS 30. In operation, a BS 32 transmits control and traffic data to mobile stations 12 on forward link channels, and receives control and traffic data from the mobile stations 12 on reverse link channels.

The BSC 26 is communicatively coupled to the PCN 22 via a Packet Control Facility (PCF) 32. The BSC 26 connects to the PCF 32 over an A8 interface carrying user traffic and an A9 interface carrying signaling. The PCF 32 manages the buffering and relay of data packets between the BS 30 and the PCN 22. As those of skill in the art will recognize, the PCF 32 may be part of the BSC 26, or may comprise a separate network entity.

The PCN 22 comprises a Packet Data Serving Node (PDSN) 34, a Home Agent (HA) 36, and an Authentication, Authorization, and Accounting (AAA) server 38. The PCN 22 may couple to the PDN 18 through a managed IP network 40, which operates under the control of the network 10. The IP network 40 connects to the PDN 18 via a $P_i$ interface, or alternatively another industry standard packet data communication protocol, such as Transport Control Program/Internet Protocol (TCP/IP). Alternatively, the PCN 22 may couple directly to the PDN 18, such as the Internet.

The PDSN 34 provides packet routing services, maintaining routing tables and performing route discovery. The PSDN 34 additionally manages the Radio-Packet (R-P) interface and Point-to-Point Protocol (PPP) sessions for mobile users, assigning authenticated mobile stations 12 an IP address from a pool of addresses. The PSDN 34 additionally frames data such as Broadcast/Multicast Services (BCMCS) media streams for transmission across the RAN to the BS 30 for transmission to one or more mobile stations 12. The PSDN 34 also provides Foreign Agent (FA) functionality for registration and service of network visitors, and initiates authentication procedures with the AAA server 38. The PSDN is communicatively coupled to the PCF 32 via an A10 interface for user traffic and an A11 interface for signaling. HA 36 operates in conjunction with PDSN 34 to authenticate Mobile IP registrations and to maintain current location information in support of packet tunneling and other traffic redirection activities. The AAA server 38 provides authentication, authorization and accounting services for the PSDN 34.

The BSC 26 may also communicatively couple the RAN 20 to an IS-41 network 24. The IS-41 network 24 includes a Mobile Switching Center (MSC) 42 accessing a Home Location Register (HLR) 44 and Visitor Location Register (VLR) 46 for subscriber location and profile information. The MSC 42, coupled to the BSC 26 via an A1 interface for signaling and A2/A5 interface for user traffic, switches circuit-mode traffic between mobile stations 12 and the PSTN 16 and ISDN 14, and provides processing and control for calls and services.

According to one or more embodiments of the present invention, the Radio Link Protocol (RLP) is utilized to transmit the faming, or packet boundary, information of higher layer packets (HLP) between a BS 30 and a mobile station 12, while optimizing the use of air interface resources to transmit user data.

Figure 2:
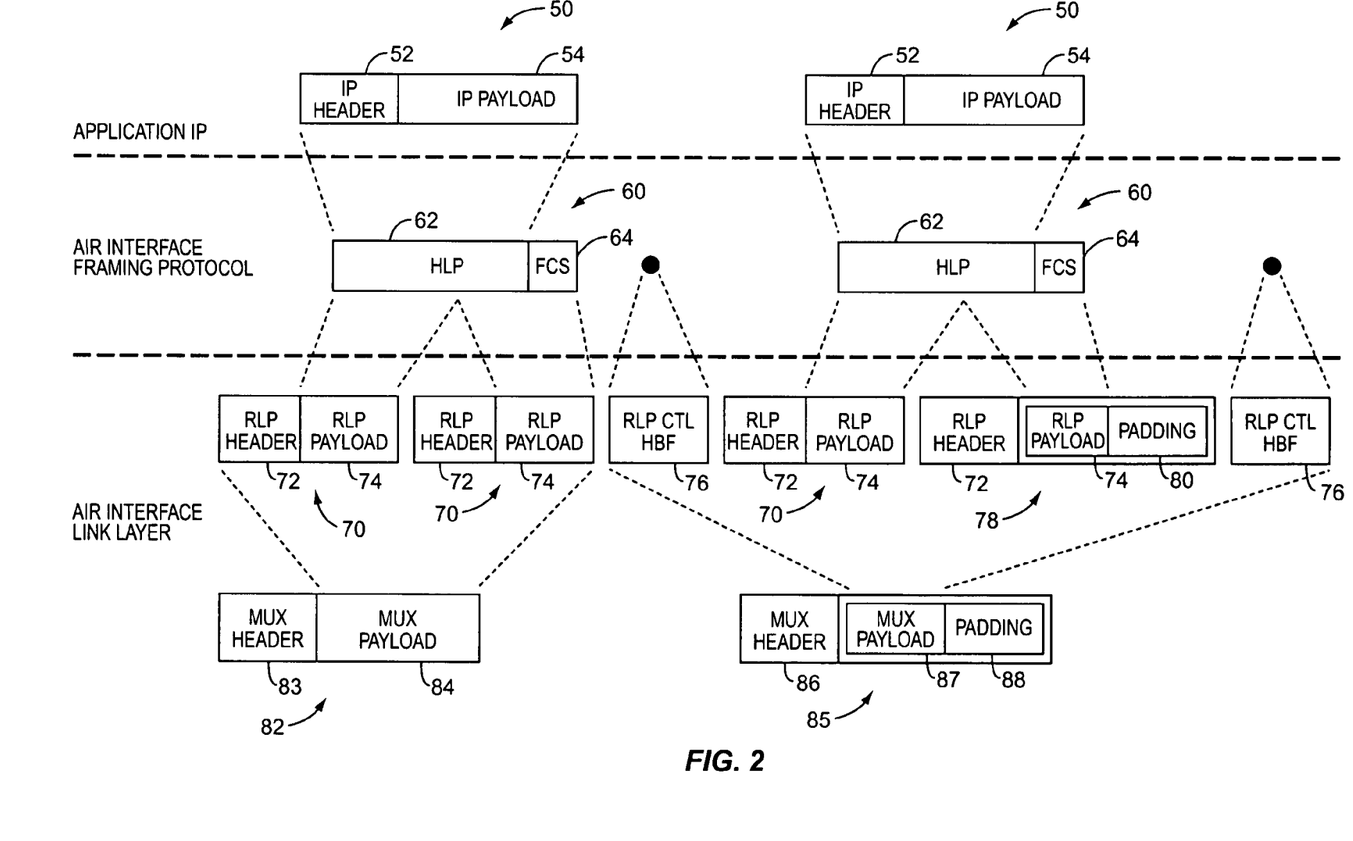
FIG. 2 is a network layer framing diagram depicting the use of RLP control frames to transmit HLP framing information.

FIG. 2 depicts a network layer diagram, showing the successive encapsulation of HLP 50 into lower level Protocol Data Units (PDUs), using the RLP to transmit HLP framing information, according to one embodiment. An HLP 50, such as for example an IP packet, comprises a header 52 and a payload 54 carrying user data. An Air Interface Framing Layer creates Frame Check Sequence Protocol Data Units (FCS PDUs) 60, by appending a Frame Check Sequence (FCS) 64 to the HLP 62. The FCS 64 allows the Framing Layer in the receiving node to perform validity checks after a complete FCS PDU 60 has been reassembled, in order to detect loss or corruption of data within the FCS PDU 60 during transmission.

In one embodiment, each FCS PDU 60 may be encapsulated in one or more Air Interface Framing Layer Protocol Data Units (AFL PDU) (not shown) by appending an AFL header to the FCS PDU 60. The AFL header may comprise START and END bits that encode whether a beginning fragment (1,0), a middle fragment (0,0), and ending fragment (0,1) or an entire FCS PDU 60 (1,1) are encapsulated in the AFL PDU. Furthermore, in one embodiment, one or more AFL PDUs may be encapsulated into one or more Air Interface Framing Layer Logical Transmission Unit (AFL LTU) (not shown), by appending an LTU INFO field containing information about the length of the AFL PDU to the AFL PDU. The LTU INFO information allows the Framing Layer in the receiving node to determine the position and size of each AFL PDU within the received AFL LTU.

As shown in FIG. 2, the FCS PDU 60 (regardless of whether it has been further encapsulated into an AFL PDU or AFL LTU) is encapsulated into one or more RLP data frames 70. As known in the art, the RLP data frame 70 comprises an RLP header 72 and an RLP payload 74 containing user data. The RLP header 72 includes a sequence number to ensure correct ordering of RLP data frames 70 at the receiver, and that all RLP data frames 70 have been received. The RLP protocol provides a negative acknowledgement procedure for the receiver to acknowledge receipt of sequential RLP data frames 70, and for the transmitter to re-transmit RLP data frames 70 that were not received.

According to one embodiment of the present invention, the boundary of a FCS PDU 60 is communicated to the receiver by transmitting a special RLP control frame, referred to herein as a HLP Boundary Frame (HBF) 76. The HBF 76 is an RLP control frame having the same syntax as an RLP Idle frame. The CTRL field of the HBF 76 is set to the value 0b1011 to indicate to the receiver that it is a HBF 76, and that it demarks the boundary of a higher layer data frame, such as a FCS PDU 60. The sequence number of the HBF 76 is set to the sequence number of the RLP data frame 70 carrying the last part of the higher layer frame 60. The RLP data frames 70, 78 and RLP HBFs 76 are encapsulated in MuxPDUs 82, each comprising a header 84 and payload 86, and transmitted to a receiver node.

A HBF 76 is sent immediately following the last RLP data frame 70 containing part of a higher layer frame 60. After decapsulation from received MuxPDUs 84, the receiver collects all the RLP frames 70 between two HBFs 76 (by sequence number) and assembles the data into a higher layer frame 60 to provide to the Framing Layer in the receiver. The receiver may, for example, extract the HLP 62 and FCS 64 from an assembled FCS PDU 60, and use the FCS to check for errors. If the FCS PDU 60 were encapsulated into AFL PDU and/or AFL LTU structures prior to transmission over the RLP, the receiver Framing Layer would decapsulate these structures as well, using the HBFs 76 to mark data frame boundaries.

Because the receiver assembles all received RLP data frames 70 between HBFs 76 into higher layer data frames, each RLP data frame 70 can contain data from only one higher layer data frame, such as a FCS PDU 60. That is, data from different FCS PDUs 60 cannot be concatenated within a single RLP data frame 70. In some embodiments, padding 80 may be added to an RLP data frame 78, such as by the BSC 26, for circuit switched channels. In other embodiments, padding 88 may be added to a MuxPDU 84, such as by the RBS 28, for packet switched channels.

The method of transmitting higher layer frame boundary information via HBFs 76 in the RLP is referred to herein as "RLP control framing assistance." This method reduces the number of overhead bits required, as compared to either the HDLC framing method or that utilized by BCMCS. This technique is particularly efficient when the size of the higher layer frames are large enough that they span several RLP data frames, and variable-size MuxPDUs 82 are utilized. For a small HLP and fixed-size MuxPDU 78, since only one higher layer frame 60 may be encapsulated in each RLP data frame 70, the RLP data frame 70 may be smaller than the MuxPDU 78, requiring padding 88 that negates the overhead savings.

Figure 3:
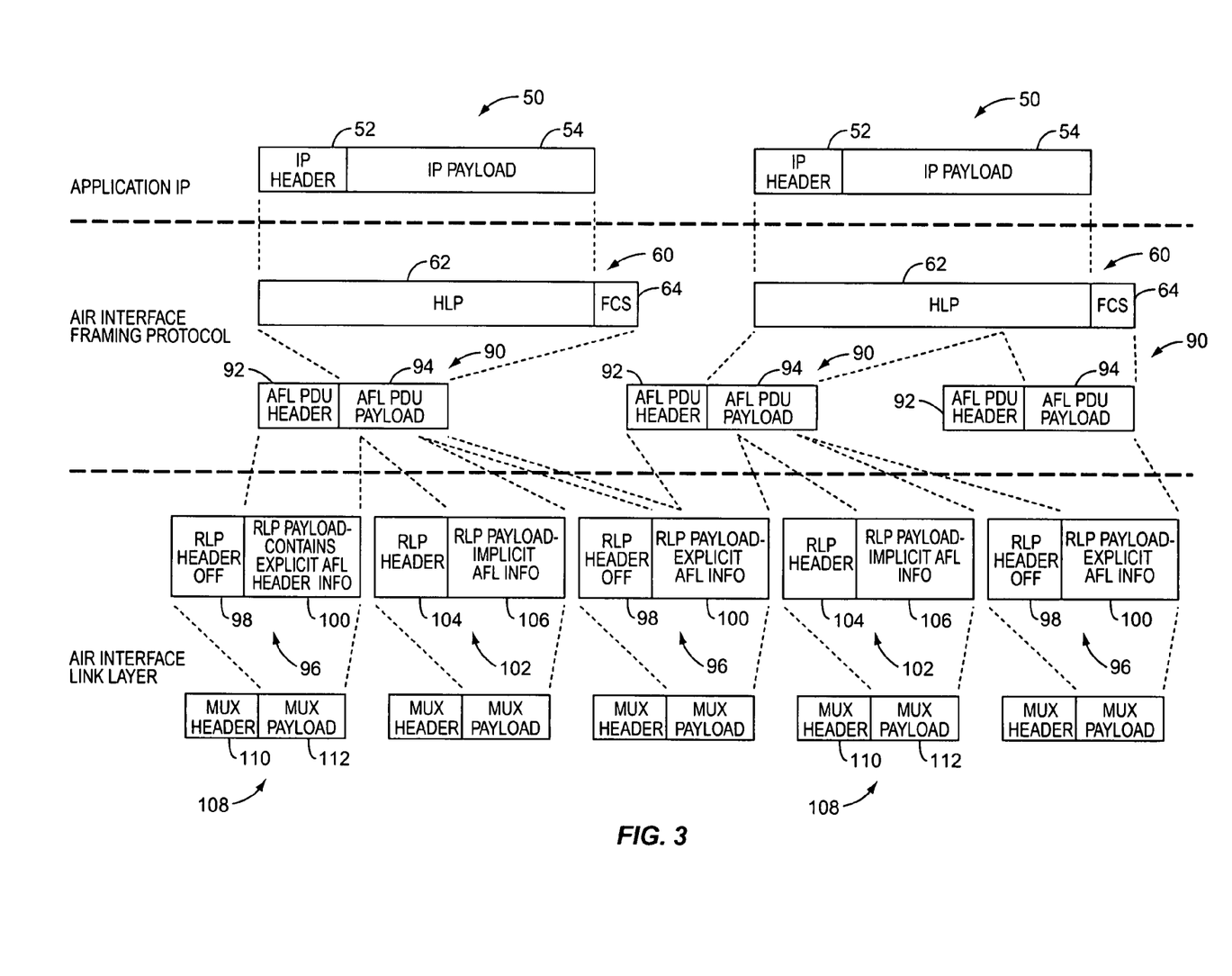
FIG. 3 is a network layer framing diagram depicting the use of RLP data frames to implicitly or explicitly transmit HLP framing information.

According to another embodiment of the present invention, as depicted in FIG. 3, modified RLP data frames 96 are employed to selectively send explicit higher layer frame boundary information, with implicit boundary information sent in conventional RLP data frames 102. This optimizes utilization of the air interface, inserting framing information bits only when necessary to signal a frame boundary to the receiver. In this embodiment, there is no restriction on the number of FCS PDUs 60 that may be encapsulated into an RLP data frame 96, 102 (or MuxPDU 108). Additionally, either fixed-size or variable-size MuxPDUs 108 may be utilized. This allows for greater efficiency in the use of air interface resources, by eliminating the need to extensively pad RLP data frames 78 or MuxPDUs 84 (FIG. 2).

In this embodiment, each FCS PDU 60 may be encapsulated in one or more AFL PDUs 90. An AFL header 92 comprising START and END bits is appended to an AFL payload 94 comprising a complete FCS PDU or a fraction of a FCS PDU. The START and END bits encode the FCS PDU fragmentation according to the following table:

TABLE 1

AFL Header encoding and RLP data frame type

| START | END | AFL framing information | RLP data frame |
|---|---|---|---|
| 1 | 0 | start of fragmented AFL PDU | explicit |
| 0 | 0 | intermediate portion of fragmented AFL PDU | explicit or implicit |
| 0 | 1 | end of fragmented AFL PDU | explicit |
| 1 | 1 | non-fragmented (complete) AFL PDU | explicit |

As Table 1 also depicts, the RLP data frame that encapsulates the AFL PDUs 90 may transmit framing information explicitly or implicitly. Framing information may be transmitted implicitly in the case of intermediate portions of fragmented AFL PDUs 90, by utilizing conventional RLP data frames 102. That is, the RLP data frame header 104 does not include an ALF INFO indicator, and the RLP data frame payload 106 contains no explicit framing information; the receiver assumes that the entire payload 106 is user data to be decapsulated and passed to a higher protocol layer.

To transmit explicit AFL framing information, such as in the case of AFL PDU framing boundaries (i.e., the beginning or end of an AFL PDU 90, or both in the case of a non-fragmented AFL PDU 90), a new RLP data frame 96 is defined. The new RLP data frame 96 includes an AFL INFO indicator. The AFL INFO indicator may be in the RLP header 98, as indicated in FIG. 3, or may alternatively be in an extended RLP header embedded in the RLP payload 100, as known in the art. The ALF INFO indicator may assume at least two values, referred to herein as ON and OFF.

When the AFL INFO indicator is ON, it indicates to the peer RLP receiver that the current RLP data frame 96—and all RLP data frames 96 to follow (by sequence number) until a contrary AFL INFO indication—contain explicit AFL framing information, such as the START and END bits of the ALF header 92. An RLP data frame 96 with the AFL INFO indicator set to ON places the receiver in a state or mode in which it will search each subsequent RLP data frame 96 for explicit framing information. Conventional RLP data frames without an ALF INFO indicator in the header or extended header may follow an ON RLP data frame 96; these RLP data frames will each contain explicit framing information.

When the AFL INFO indicator is OFF, it indicates to the peer RLP receiver that the current RLP data frame 96 contains explicit AFL framing information; however, no following RLP data frames 102 (by sequence number) will contain explicit AFL framing information. An RLP data frame 96 with the ALF INFO indicator set to OFF removes the receiver from the state or mode of searching each subsequent RLP data frame 102 for explicit framing information. An RLP data frame with the AFL INFO indicator set to OFF may also be utilized to transmit explicit framing information when the receiver is in the OFF state.

This method of transmitting higher layer frame boundary information via RLP data frames 96 containing explicit framing data is referred to herein as "RLP data framing assistance." Using this method, multiple ALF PDUs 90 (hence multiple FCS PDUs 60), or fragments thereof, may be encapsulated in a single RLP data frame 96. This allows for efficient use of air interface resources when transmitting short HLP 50, eliminating the need to pad RLP data frames 96, 102 or MuxPDUs 108. In this case, an RLP data frame 96 with the AFL INFO indicator ON may set the receiver in a mode to extract explicit framing information from each received RLP data frame 96.

In a situation where large HLP 50 are being transmitted, the corresponding AFL PDUs 90 will be encapsulated across numerous RLP data frames 96, 102. In this case, air interface resources may be further conserved by only transmitting framing information where necessary—i.e., at the AFL PDU boundaries, as depicted in FIG. 3. An initial RLP data frame 96 is transmitted, with the AFL INFO indicator OFF, informing the receiver that the current RLP payload 100 contains explicit framing information (the beginning of an AFL PDU 90), but subsequent RLP data frames 102 will not. The intermediate fragments of the ALF PDU 90 are transmitted in conventional RLP data frames 102, with no explicit framing information. That is, the entire RLP payload 102 carries user data, and the receiver will assemble the entire RLP payload 102 into an AFL PDU 90 to pass to a higher protocol layer. The framing information—that the RLP payload 102 is an intermediate fragment of an AFL PDU 90—is implicit, and no air interface resources are consumed to transmit this information.

When the ALF PDU 90 terminates, the transmitter may utilize another RLP data frame 96 containing explicit framing information to indicate this fact. If following AFL PDU 90 is long and will span plural RLP data frames 102, the explicit RLP data frame 96 may set the AFL INFO indicator to OFF, indicating that only that RLP data frame 96 includes framing information. Conversely, if following AFL PDUs are short and each RLP data frame 96 will contain AFL PDU boundaries, the transmitter may set the receiver to a mode of expecting framing information in each RLP data frame 96 by setting the AFL INFO indicator to ON. In this manner, explicit or implicit framing information may be selectively transmitted in the RLP data frames 96, 102 in response to the RLP encapsulation. This maximizes efficiency by only consuming air interface resources to explicitly indicate framing information where necessary.

Under either method disclosed above—RLP control framing assistance or RLP data framing assistance—the RLP may additionally assist the framing layer in the receiver to reconstruct HLP. Each RLP data frame includes a sequence number. The framing layer in the receiver may receive frame boundary information from the RLP by one of the methods disclosed herein, and may utilize RLP sequence numbers to ascertain if any intervening portions of the HLP are missing. If so, the framing layer may discard the beginning and ending segments, and request retransmission or other error handling mechanism via higher level protocols. In the case that a HLP includes information to perform this error-checking (such as, for example, the FCS field of a BCMCS frame), the error-checking information may be omitted, further optimizing utilization of air interface resources.

Which method of HLP framing information transmission to utilize—HDLC, BCMCS, RLP control framing assistance, or RLP data framing assistance—may depend on several factors. Some of these are consistent, e.g., HDLC always imposes higher processor loading, due to the requirement that each octet be inspected for frame boundary and/or escape characters. Other factors vary from application to application and over time, such as, e.g., the traffic type and available bandwidth. In some embodiments, the framing protocols may be statically determined; in other embodiments, they may be dynamically selected.

By way of non-limiting examples, fixed-rate video is generally transmitted at 24 Kb/sec in fixed size packets. Framing information for this type of traffic may optimally be transmitted by RLP data framing assistance, which minimizes the framing overhead content of the RLP data load. On the other hand, variable rate video is characterized by fluctuations in both data rate and packet size, as the amount of data transmitted varies according to the inter-frame motion in the video content. In some cases, HDLC may be the preferred HLP framing transmission protocol for variable rate video, as it is one continuous octet stream.

As discussed above, RLP control framing may be preferred when the HLP are very large, such as certain types of data file transmission, since the framing information is in control frames and the RLP data frames may be dedicated to user data. Where HLP are short, such as HTTP transmissions common in web browsing applications, the restriction of one HLP per RLP data frame of RLP control framing assistance may require excessive padding of RLP data frames and/or MuxPDUs; in these applications, RLP data framing assistance may be preferred. In some embodiments, the RLP framing assistance method may be dynamically switched based on inspection of the HLP properties, by RLP control frames or other transmitter/receiver communication at the RLP level.

In addition to the RLP control framing assistance and RLP data framing assistance discussed above, another form of RLP framing assistance is defined, referred to herein as hybrid RLP framing assistance. Hybrid RLP framing assistance may both embed HLP framing information in some RLP data frames, and use RLP control frames to alert the RLP receiver as to which RLP data frames include the HLP framing information. Three forms of hybrid RLP framing assistance are defined: Unnumbered control frame; numbered empty data frame; and alternately numbered control frame. Each method is discussed herein.

Common to all three forms of hybrid RLP framing assistance (and also to RLP data framing assistance discussed above) is the concept of Application Framing Layer (AFLf) State. The framing layer in the transmitter and receiver support three states: persistent-on (PO), persistent-off (PF), and off (OFF). In the PO state, the framing layer in the transmitter includes HLP framing information in each RLP data frame. Where the framing layer encapsulates HLPs into AFL PDUs, as discussed above, the HLP framing information may comprise AFL PDU headers and LTU Info elements.

In the PF state, the transmitter's framing layer does not include HLP framing information in each RLP data frame. In PF, RLP data frames include only data from middle portions of a HLP. In the OFF state, the framing layer in the transmitter includes HLP framing information in one or more RLP data frames. The OFF state differs from the PO state in that the OFF state is occupied only temporarily. The framing layer normally enters the OFF state from the PF state. It remains in the OFF state only until the next HLP encapsulation is generated, after which the framing layer returns to the PF state. Alternatively, the framing layer may transition to the PO state from the OFF state, if HLP framing information is included in each subsequent RLP data frame generated.

At the receiver, the framing layer processes received RLP data frame payloads in accordance with the current state of the framing layer. In the PO state, the framing layer examines each RLP data frame payload for explicit HLP framing information (e.g., indicators whether the RLP data frame payload forms the beginning, middle, or end fragment of an HLP). In the PF state, the framing layer does not examine the RLP data frame payloads for HLP framing information. Rather, the framing layer assumes that the RLP data frame payloads contain middle fragments of the HLP currently being constructed at the RLP receiver. In the OFF state, the receiver examines the next RLP data frame payload received for HLP framing information, and then normally transitions back to the PF state for subsequent RLP data frames.

The transmitter initiates a framing layer state transition to the PF state only if the transmitter determines, based on HLP size, available bandwidth, and other parameters, that operation in the PF state will reduce framing overhead.

In the three forms of hybrid RLP framing assistance—unnumbered control frame, numbered empty data frame, and alternately numbered control frame—both RLP data frames and RLP control frames (or, in one case, RLP data frames that function as control frames) are utilized to transmit HLP framing information from the RLP transmitter to the RLP receiver. In general, the RLP control frames (or control frame function) specify the AFL State of the framing layers in the RLP transmitter and receiver, and the RLP data frames carry HLP framing information, or not, based on the AFL state.

With hybrid RLP framing assistance, there is no restriction that data in a RLP data frame must be from only one HLP (as is the case with RLP data framing assistance discussed above). Thus, padding bits are not required when the last fragment of a HLP does not completely fill a RLP data frame or MuxPDU. Rather, the transmitter framing layer can completely fill each RLP data frame or MuxPDU by combining data from the next HLP with the data from a prior HLP (and including HLP framing information), thus achieving bandwidth efficient transmission of data.

In unnumbered control frame hybrid RLP framing assistance, AFL state transition information is transmitted to the receiver in an unnumbered RLP control frame (that is, a RLP control frame that is not assigned a RLP sequence number). In the PF state, this means that OFF state transitions may be transmitted to the receiver as necessary to indicate when one or more RLP data frames contain explicit HLP framing information. The unnumbered RLP control frame is sent utilizing existing RLP control procedures.

The unnumbered RLP control frame includes an End-SEQ field that identifies the RLP sequence number of the RLP data frame to which a AFL state transition is directed (when the ALF state is OFF, End-SEQ indicates which RLP data frame contains explicit HLP framing information). The AFL state to be applied when processing data in the RLP data frame of the indicated RLP sequence number is specified in a AFL Info indicator.

The unnumbered control frame may identify more than one RLP data frame. The unnumbered control frame includes a SEQ Count field that indicates whether, and if so how many, additional RLP sequence numbers are included in the unnumbered control frame, identifying additional RLP data frames that include HLP framing information. Additional instances of the End-SEQ parameters are utilized for each such additional RLP data frame identification. The unnumbered control frame may additionally include a Fill indicator and Idle indicator, indicating whether the frame additionally includes Fill frame or Idle frame information, respectively, as defined in the RLP specification.

The unnumbered control frames do not participate in the RLP NAK-based error detection and retransmission protocol, wherein the RLP sequence numbers are utilized by the receiver to ensure correct, in-order receipt of each RLP data frame. Consequently, one or more unnumbered control frames in an unnumbered control frame hybrid RLP framing assistance protocol may be lost, depending on the forward error rate (FER) of the RLP data link. In this case, the RLP receiver framing layer will not be alerted as to which RLP data frames contain HLP framing information. In this case, the RLP receiver may be unable to accurately partition received data from RLP data frames into correct HLPs. This effect is similar to the loss of a frame carrying HDLC frame boundary information.

Accordingly, numbered empty data frame hybrid RLP framing assistance is defined. The AFL state of the transmitter and receiver framing layer is communicated from the RLP transmitter to the RLP receiver in an "empty" RLP data frame having an RLP sequence number. The RLP data frame does not include any HLP data in its payload. The numbered RLP data frame functions as an RLP control frame, and is also referred to herein as a control frame function. It is denoted as an RLP data frame herein since the transmission is assigned an RLP sequence number, and it fully participates in the RLP NACK-based error correction and retransmission protocol.

The numbered RLP data frame containing no HLP data includes an AFL Info field that specifies the AFL state of the framing layer for at least the immediately preceding RLP data frame (in RLP sequence numbers). The numbered RLP data frame containing no HLP data additionally includes a SEQ Count field, indicating whether, and if so how many, additional RLP data frames are identified as additionally being processed with the specified AFL state (for example, in the OFF state, indicating that only the identified RLP data frames include HLP framing information). If the SEQ Count field is greater is zero, the numbered RLP data frame containing no HLP data will additionally include one or more End-SEQ fields identifying the additional RLP data frames by RLP sequence number. The numbered RLP data frame containing no HLP data may additionally include a Fill indicator and Idle indicator, indicating whether the frame additionally includes Fill frame or Idle frame information, respectively, as defined in the RLP specification.

Transmitting AFL state information from the RLP transmitter to the RLP receiver by a numbered RLP data frame containing no HLP data allows the AFL state information to be communicated reliably, unlike communicating the same information in an unnumbered control frame. However, since the unnumbered RLP data frame containing no HLP data consumes an RLP sequence number, without transmitting HLP data, it may lead to queue stalling, depending on the channels utilized. Accordingly, a third mode of hybrid RLP framing assistance is defined: alternately numbered control frame.

AFL state information may be transmitted from an RLP transmitter to an RLP receiver in a control frame utilizing an independent sequence space. That is, an RLP sequence space for control frames—referred to herein as the RLP control frame sequence space—is defined and maintained separately and independently from the RLP data frame sequence space. A NACK-based error detection and correction protocol is defined and operates for the RLP control frame sequence space separately from, and in parallel with, error detection and correction protocol currently defined for the RLP data frame sequence space. This removes the RLP transmission of AFL from the RLP data frame sequence space (alleviating queue stall pressure), while ensuring reliable transmission of the AFL state information. Use of the alternately numbered control frame to transmit AFL state information additionally maintains the logical separation between RLP control frame and data frame functionality.

The alternately numbered control frame is similar to the unnumbered control frame discussed above, with the exception that it is assigned a unique sequence number from the control frame sequence space. The alternately numbered control frame includes an AFL Info indicator that specifies the AFL state of the framing layer in the transmitter and receiver for at least one identified RLP data frame. The RLP data frame is identified by RLP data frame sequence number in an End-SEQ field. More than one such RLP data frame may be specified by the alternately numbered control frame, as indicated in a SEQ Count field. The alternately numbered control frame may additionally include a Fill indicator and Idle indicator, indicating whether the frame additionally includes Fill frame or Idle frame information, respectively, as defined in the RLP specification.

The hybrid RLP framing assistance methods utilize both RLP data frame and RLP control frame functionality to communicate HLP framing information from an RLP transmitter to and RLP receiver. In general, they accomplish this by transmission of the applicable AFL state for one or more explicitly or implicitly identified RLP data frames. In one embodiment, efficient utilization of RLP bandwidth may be achieved in the transmission of a plurality of large HLPs, each spanning a plurality of RLP data frames (or MuxPDUs).

As depicted in FIG. 3 a HLP is encapsulated into a plurality of RLP data frames, with HLP framing information included in only the first and last RLP data frame (block 120). The framing layers are set to the OFF state (block 122) by transmitting a control frame function from the RLP transmitter to the RLP receiver identifying the RLP data frame containing the beginning of the HLP. The control frame function may comprise an actual control frame, such as an unnumbered or alternately numbered control frame, or it may comprise a numbered RLP data frame containing no HLP data.

Figure 4:
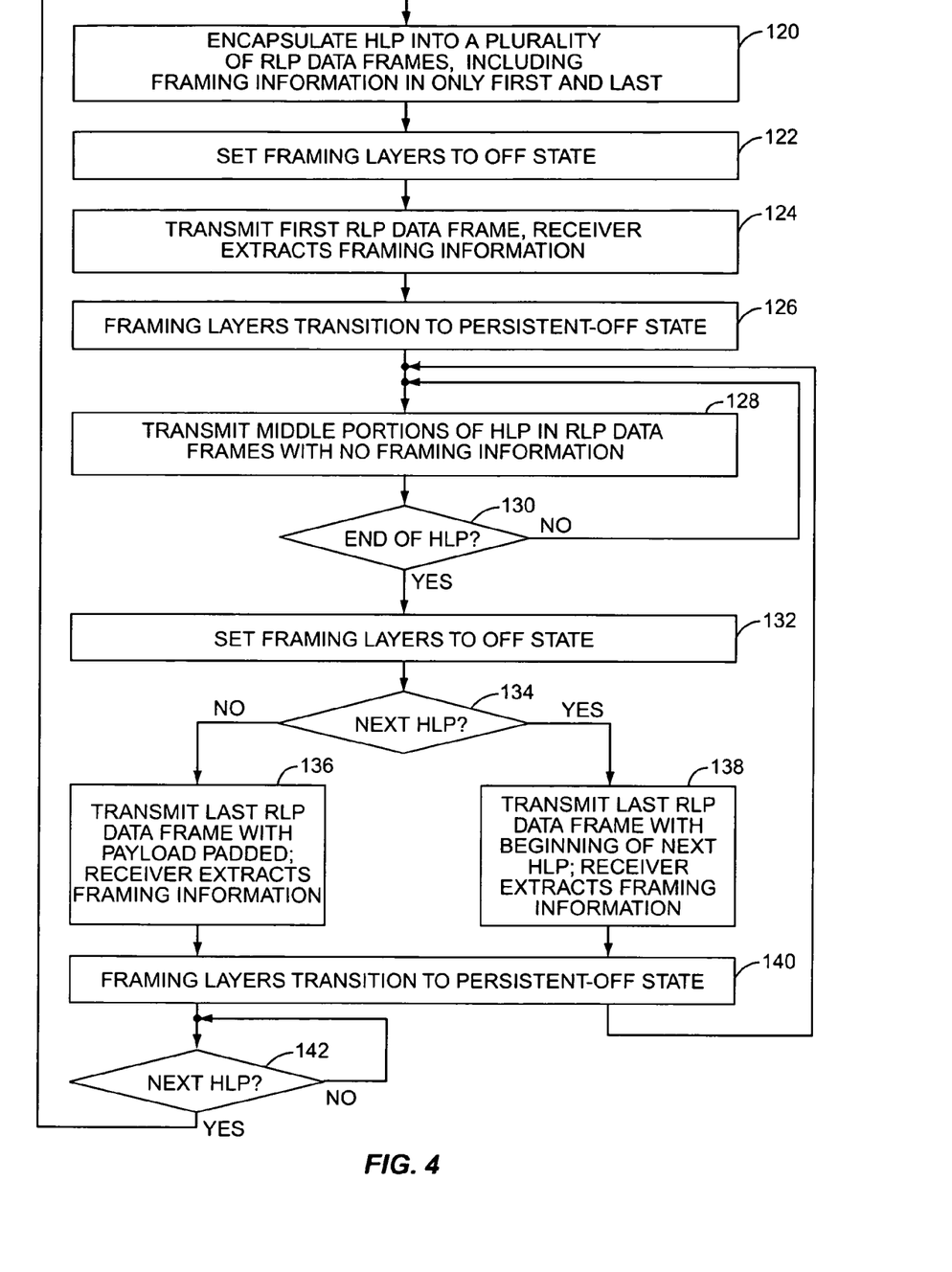
FIG. 4 is a flow diagram of a method of hybrid RLP framing assistance.

Regardless of the form of the control frame function, the first RLP data frame (containing HLP framing information) is transmitted from the RLP transmitter to the RLP receiver (block 124). The receiver extracts the framing information from the received RLP data frame (identified by the control frame function). The framing layers transition (e.g., by default) from OFF to Persistent-Off state (block 126). Middle portions of the HLP are subsequently transmitted in RLP data frames, with no HLP framing information (block 128). This reserves the full RLP data frame payload for HLP data, maximizing the utilization of bandwidth for the transmission of HLP data.

When the end of the HLP is reached (block 130), the framing layers are set to the OFF state for the last RLP data frame (132) by transmitting a control frame function identifying the last RLP data frame. If another HLP is not ready for transmission (block 134), the last RLP data frame—containing HLP framing information—is padded and transmitted to the receiver (block 136). If another HLP is ready for transmission (block 134), the last RLP data frame, including both the end of the first HLP and the beginning of the second HLP, and HLP framing information indicating such, is transmitted (block 138). In either case, the framing layers transition from the OFF state to the Persistent-Off state (block 140). If the second HLP was started, then middle portions of that HLP are transmitted in RLP data frames without HLP framing information (block 128), and the processing of the second HLP proceeds. If a second HLP was not started, the RLP transmitter waits for the next HLP (block 142), and starts over at block 120 when it is received.

Figure 5:
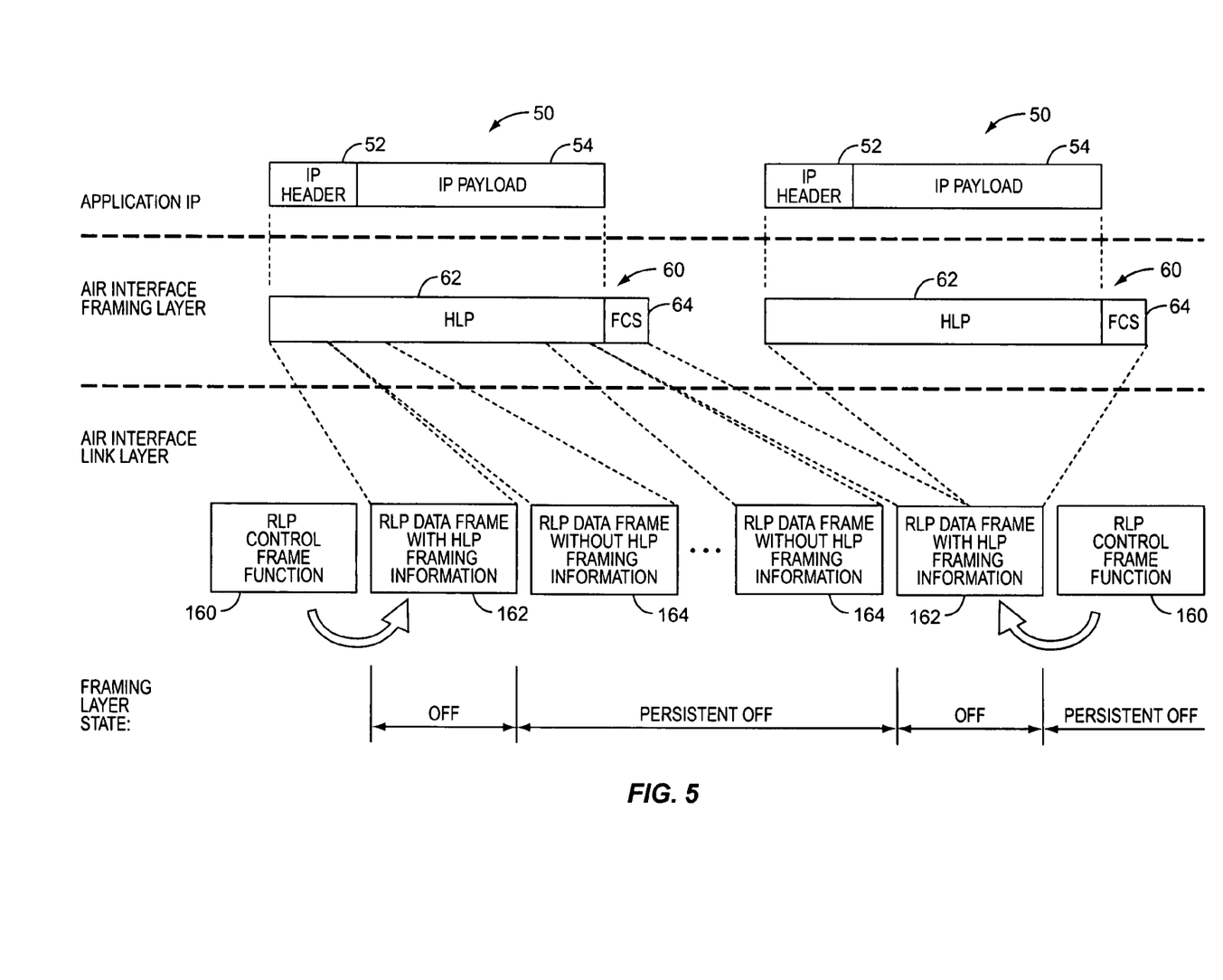
FIG. 5 is a network layer framing diagram depicting the use of both RLP data frames and RLP control frame functions to transmit HLP framing information

FIG. 5 depicts the hybrid RLP framing assistance in block diagram form. As described above, application IP packets 50 (comprising an IP header 52 and IP payload 54) are encapsulated into one or more HLPs 60 (comprising the HLP 62 and FCS 64). The HLPs 60 are encapsulated into RLP data frames 162 that contain HLP framing information, and RLP data frames 164 that do not contain any HLP framing information. In one embodiment, only the first and last RLP data frames 162 of a HLP include HLP framing information, and all intermediate RLP data frames 164 do not.

The framing layers are placed in the OFF state for the RLP data frames 162 including HLP framing information by an RLP control frame function 160. The RLP control frame function 160 may comprise an unnumbered or alternately numbered control frame, or an empty numbered data frame (i.e., an RLP data frame containing no HLP data). Each RLP control frame function 160 identifies the RLP data frame 162 for which the framing layers are to assume the OFF state. In the case of unnumbered or alternately numbered control frames, the identification is explicit, via RLP sequence number. In the case of empty numbered data frames, the identification is implicit—being the RLP data frame 162 preceding the RLP sequence number of the control frame function 160. When all RLP data frames 162 identified by the RLP control frame function 160 have been processed, the framing layers transition to the Persistent-Off state, and the receiver assumes the RLP data frames 164 to contain only data from middle portions of the HLP, and no HLP framing information.

As FIG. 5 indicates, data from different HLPs may be transmitted in a single RLP data frame 162. This eliminates the need to pad RLP data frames containing the end of a HLP. In this manner, large HLPs may be transmitted to the receiver with maximum bandwidth efficiency. The three hybrid RLP framing assistance methods allow for various tradeoffs in control frame function 160 transmission reliability, efficient utilization of RLP data frame sequence space, implementation complexity, and backward compatibility.

Generally speaking, the five RLP framing assistance methods disclosed herein are preferred over HDLC and BCMCS in low bandwidth environments, as they dedicate more payload octets to user data and less to framing information overhead. However, switching in and out of the HDLC and BCMCS protocols generally requires higher level signaling between the framing layers at the transmitter and receiver. Consequently, the ability to dynamically switch between these framing protocols and the RLP framing assistance methods may be constrained.

Those of skill in the art will recognize that the specific embodiments disclosed and discussed herein are exemplary only. In particular, the present invention does not depend on the encapsulation of HLP into FCS PDUs or AFL PDUs, nor are other framing layer encapsulations (such as, for example, the encapsulation of AFL PDUs into AFL LTUs) precluded by the present invention. According to the present invention, any higher layer data structure (whether denoted as a packet, frame, or otherwise) may advantageously be transmitted using the RLP to transmit the framing information, as disclosed herein. The specific examples disclosed and depicted in the drawing figures are utilized to place the present invention in context and to facilitate understanding by those of skill in the art; however the present invention is not limited to any such context, and is limited only by the following claims.

Furthermore, although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of transmitting one or more Higher Layer Packets (HLP) between a transmitter and a receiver in a wireless communication network utilizing the Radio Link Protocol (RLP), comprising:

encapsulating a HLP into a plurality of RLP data frames, each having a unique RLP sequence number, such that only the RLP data frame containing the beginning of the HLP and the RLP data frame containing the end of the HLP include HLP framing information;

transmitting the RLP data frames from a wireless communication network transmitter to a wireless communication network receiver; and separately transmitting from the wireless communication network transmitter to the wireless communication network receiver an indication of which RLP data frames contain HLP framing information.

2. The method of claim 1 further comprising encapsulating the HLP into one or more lower layer data structures prior to encapsulation into RLP data frames.

3. The method of claim 1 wherein the indication of which RLP data frames contain HLP framing information comprises a RLP control frame having the RLP sequence number of at least one RLP data frame containing HLP framing information.

4. The method of claim 3 wherein the RLP control frame includes a CTL field value of 0'b1011.

5. The method of claim 3 wherein the RLP control frame includes a AFL Info field specifying the RLP receiver AFL State that applies when processing the RLP data frame identified by the RLP sequence number.

6. The method of claim 3 wherein the RLP control frame includes a SEQ Count field indicating whether additional RLP sequence numbers, indicating additional RLP data frames containing HLP framing information, are included in the control frame.

7. The method of claim 1 wherein the indication of which RLP data frames contain HLP framing information comprises a RLP data frame, having a unique RLP sequence number and carrying no HLP data, transmitted to the receiver following the RLP data frame containing the end of a HLP.

8. The method of claim 7 wherein the RLP data frame having a unique RLP sequence number and carrying no HLP data indicates that at least the immediately preceding RLP data frame in sequence number order includes HLP framing information.

9. The method of claim 8 wherein the RLP data frame having a unique RLP sequence number and carrying no HLP data includes a SEQ Count field indicating whether additional RLP sequence numbers, indicating additional RLP data frames containing HLP framing information, are included in the RLP data frame having a unique RLP sequence number and carrying no HLP data.

10. The method of claim 7 wherein the RLP data frame having a unique RLP sequence number and carrying no HLP data includes a CTL field value of 0'b1011.

11. The method of claim 7 wherein the RLP data frame having a unique RLP sequence number and carrying no HLP data includes a AFL Info field specifying the RLP receiver AFL State that applies when processing the immediately preceding RLP data frame in sequence number order.

12. The method of claim 11 wherein the AFL State specified by the AFL Info field applies to additional RLP data frames, if any, indicated by the SEQ Count field value.

13. The method of claim 7 further comprising retransmitting the RLP data frame having a unique RLP sequence number and carrying no HLP data upon receipt of a NACK request from the receiver having the same RLP sequence number.

14. The method of claim 1 wherein the indication of which RLP data frames contain HLP framing information comprises a RLP control frame having a unique RLP control frame sequence number, the RLP control frame additionally including the RLP sequence number of at least one RLP data frame containing HLP framing information.

15. The method of claim 14 further comprising retransmitting the RLP control frame upon receipt of a NACK request from the receiver having the same RLP control frame sequence number.

16. The method of claim 14 wherein the RLP control frame includes a CTL field value of 0'b1011.

17. The method of claim 14 wherein the RLP control frame includes a AFL Info field specifying the RLP receiver AFL State that applies when processing the RLP data frame identified by the RLP sequence number.

18. The method of claim 14 wherein the RLP control frame includes a SEQ Count field indicating whether additional RLP sequence numbers, indicating additional RLP data frames containing HLP framing information, are included in the control frame.

19. A Radio Link Protocol (RLP) transmitter, comprising:
an control circuit operative to encapsulate a Higher Layer Packet (HLP) into a plurality of RLP data frames, each having a unique RLP sequence number, such that only the RLP data frame containing the beginning of the HLP and the RLP data frame containing the end of the HLP include HLP framing information; and
a transmitter operative to transmit the RLP data frames to a RLP receiver, and further operative to separately transmit to the receiver an indication of which RLP data frames contain HLP framing information.

20. The transmitter of claim 19 wherein the control circuit is further operative to encapsulate the HLP into one or more lower layer data structures prior to encapsulation into RLP data frames.

21. The transmitter of claim 19 wherein the indication of which RLP data frames contain HLP framing information comprises a RLP control frame having the RLP sequence number of at least one RLP data frame containing HLP framing information.

22. The transmitter of claim 21 wherein the RLP control frame includes a Application Framing Layer (AFL) Info field specifying the RLP receiver AFL State that applies when processing the RLP data frame identified by the RLP sequence number.

23. The transmitter of claim 21 wherein the RLP control frame includes a SEQ Count field indicating whether additional RLP sequence numbers, indicating additional RLP data frames containing HLP framing information, are included in the control frame.

24. The transmitter of claim 19 wherein the indication of which RLP data frames contain HLP framing information comprises a RLP data frame, having a unique RLP sequence number and carrying no HLP data, transmitted to the receiver following the RLP data frame containing the end of a HLP.

25. The transmitter of claim 24 wherein the RLP data frame having a unique RLP sequence number and carrying no HLP data indicates that at least the immediately preceding RLP data frame in sequence number order includes HLP framing information.

26. The transmitter of claim 24 wherein the RLP data frame having a unique RLP sequence number and carrying no HLP data includes a AFL Info field specifying the RLP receiver AFL State that applies when processing the immediately preceding RLP data frame in sequence number order.

27. The transmitter of claim 24 wherein the RLP data frame having a unique RLP sequence number and carrying no HLP data includes a SEQ Count field indicating whether additional RLP sequence numbers, indicating additional RLP data frames containing HLP framing information, are included in the RLP data frame having a unique RLP sequence number and carrying no HLP data.

28. The transmitter of claim 24 wherein the AFL State specified by the AFL Info field applies to additional RLP data frames, if any, indicated by the SEQ Count field value.

29. The transmitter of claim 24 wherein the transmitter retransmits the RLP data frame having a unique RLP sequence number and carrying no HLP data upon receipt of a NACK request from the receiver having the same RLP sequence number.

30. The transmitter of claim 19 wherein the indication of which RLP data frames contain HLP framing information comprises a RLP control frame having a unique RLP control frame sequence number, the RLP control frame additionally including the RLP sequence number of at least one RLP data frame containing HLP framing information.

31. The transmitter of claim 30 wherein the transmitter retransmits the RLP control frame upon receipt of a NACK request from the receiver having the same RLP control frame sequence number.

32. The transmitter of claim 30 wherein the RLP control frame includes a AFL Info field specifying the RLP receiver AFL State that applies when processing the RLP data frame identified by the RLP sequence number.

33. The transmitter of claim 30 wherein the RLP control frame includes a SEQ Count field indicating whether additional RLP sequence numbers, indicating additional RLP data frames containing HLP framing information, are included in the control frame.

* * * * *

UNITED STATES PATENT AND TRADEMARK OFFICE
CERTIFICATE OF CORRECTION

| | | |
|---|---|---|
| PATENT NO. | : 7,586,882 B2 | Page 1 of 1 |
| APPLICATION NO. | : 11/140388 | |
| DATED | : September 8, 2009 | |
| INVENTOR(S) | : Sivalingham et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Twenty-first Day of September, 2010

David J. Kappos
*Director of the United States Patent and Trademark Office*